April 21, 1964 L. C. HUMPHREY 3,130,409
RADIO DIRECTION FINDING SYSTEM
Filed Feb. 12, 1962 2 Sheets-Sheet 1

INVENTOR.
LEONARD C. HUMPHREY
BY
ATTORNEYS

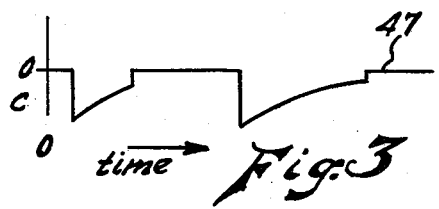
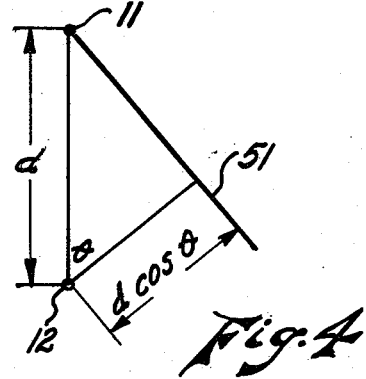
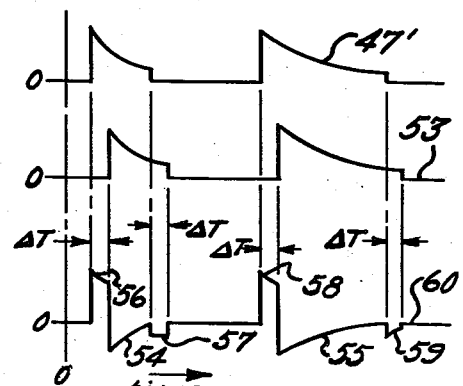

United States Patent Office 3,130,409
Patented Apr. 21, 1964

3,130,409
RADIO DIRECTION FINDING SYSTEM
Leonard C. Humphrey, Dryden, N.Y., assignor to the United States of America as represented by the Secretary of the Air Force
Filed Feb. 12, 1962, Ser. No. 172,832
3 Claims. (Cl. 343—113)
(Granted under Title 35, U.S. Code (1952), sec. 266)

The invention described herein may be manufactured and used by or for the United States Government for governmental purposes without payment to me of any royalty thereon.

This invention relates to radio direction finders, and more particularly to an improved direction finding system of the so-called Adcock type.

A very basic radio direction finding system comprises a vertical loop antenna in combination with detecting means. When the plane of such a loop antenna is perpendicular to the direction of travel of an electromagnetic wave, the voltages induced in the two vertical sides are of equal magnitude and have the same phase. Being directed around the loop in opposite directions, however, these voltages cancel each other out and result in zero loop current. The direction in which a radio wave travels, therefore, is determined by rotating the loop antenna until an associated radio receiver indicates zero response.

However, a loop antenna will give correct bearings only when no horizontally polarized downcoming waves are present. The reason for this is that such waves induce voltages in horizontal members of the loop that do not cancel out even when the plane of the loop is perpendicular to the bearing angle of the radio wave. The errors in bearing caused by such downcoming horizontally polarized sky waves have been eliminated by replacing the loop antenna with an Adcock antenna, which in its simplest form consists of two spaced vertical antennas. The action of such an antenna is identical with the loop antenna. This is the case because the resultant output current of the Adcock antenna is proportional to the vector difference of the voltages induced in the two vertical members, exactly as is the case with the loop. Horizontally polarized downcoming waves do not affect the Adcock antenna since the voltages induced in the two horizontal members are the same in phase as well as magnitude and so cancel each other out. The conventional Adcock array comprises two pairs of spaced vertical antennas, usually designated N, S and E, W, together with a sense antenna, said sense antenna having the function of resolving the 180° ambiguity inherent in such a system. The amplified outputs of the N, S pair and the E, W pair of antennas are applied to the deflection circuits of a cathode ray oscilloscope. The amplitude of these outputs are, of course, respectively proportional to the cosine and to the sine of the azimuth of arrival of the signal wave at the antennas. Assuming that the gains of the amplifier means are equal, the cathode ray beam will trace a line across a diameter of the oscilloscope screen with an angular orientation corresponding to the signal azimuth.

By maintaining symmetry with respect to ground and by enclosure in an electrostatic shield, the Adcock antenna system makes it possible to obtain accurate bearings under conditions where a loop antenna is utterly useless.

Although the Adcock antenna system represents an important step forward in the art, the problem of maintaining symmetry with respect to ground has remained a vexing limitation, and prior to my invention, has been accomplished only by the tedious procedure of continuously balancing the effective heights of the antennas. This procedure comprehends the making of critical adjustments of the effective heights of the vertical antennas for every change in weather or ground condition.

This problem is effectively solved by my invention, wherein the basis of operation is dependent upon the novel concept of changing the waveform received at the antenna into a waveform that is substantially independent of the effective height of said antennas. Furthermore it is an additional feature of my invention that the circuits described therein provide an automatic sense which removes the 180° ambiguity of direction, thereby obviating the need for an additional sensing antenna.

Accordingly it is the principle object of my invention to provide a novel radio direction finder system of the so-called Adcock type wherein the response therefrom is substantially independent of the effective heights of its receiving antennas.

It is a further object of my invention to provide a radio direction finder system of the type described wherein the 180° ambiguity of direction inherent in such systems is automatically resolved.

It is a still further object of my invention to provide a radio direction finder system of the type described that is readily adaptable to rapid set-up of equipment in the field.

It is a still further object of my invention to provide a novel means whereby a so-called Adcock radio direction finder system, by application of the inventive concepts taught herein and the use of commercially available components, be readily converted into a radio direction finder system that is substantially insensitive to variations in effective antenna height.

These and other objects and features of my invention will become more apparent by reference to the following description taken in conjunction with the accompanying drawings, in which:

FIG. 3a illustrates a typical waveform appearing at point A of FIG. 2;

FIG. 3b illustrates a typical waveform appearing at point B of FIG. 2;

FIG. 3c illustrates a typical waveform appearing at point C of FIG. 2;

FIG. 4 illustrates the relationship between electromagnetic wave components and antenna position; and FIG. 5 illustrates the relationship of waveforms appearing at one set of cathode ray oscilloscope deflection plates.

As indicated above, the inventive concepts of the subject radio direction finding system reside in the novel circuitry I have developed, whereby voltage waveforms responsive to the electromagnetic wave being detected are presented to indicating means in a form that is independent of the effective height of the receiving antennas. Such waveforms are presented on appropriate indicating means, such as a cathode ray oscilloscope, in mutually distinguishable forms, each representative of one or the other of the two antenna structures (11—12, or 13—14).

Figure 1:
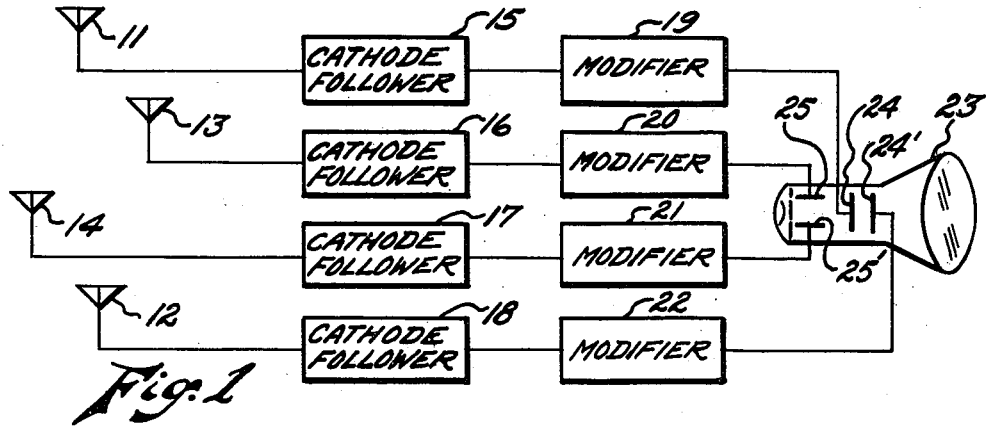
FIG. 1 is a block diagram of one preferred embodiment of my invention.

Referring now to FIG. 1, there is illustrated a block diagram of a presently preferred embodiment of my invention. Antennas 11 through 14 are arranged in the conventional Adcock array, and for convenience of explanation antennas 11 and 12 will hereinafter be referred to as the north-south, or N, S pair and antennas 13 and 14 as the east-west or E, W pair. The outputs of said antennas are amplified by cathode followers 15 through 18 and then applied to modifiers 19 through 22. Said modifiers operate to convert the signals received from cathode followers 15 through 18 into uniform waveforms that, when applied to deflection plates 24, 25 of cathode ray oscilloscope 23, initiate beam deflection that is responsive to the difference in time-of-arrival of the electromagnetic wavefront at each of said antennas.

Figure 2:
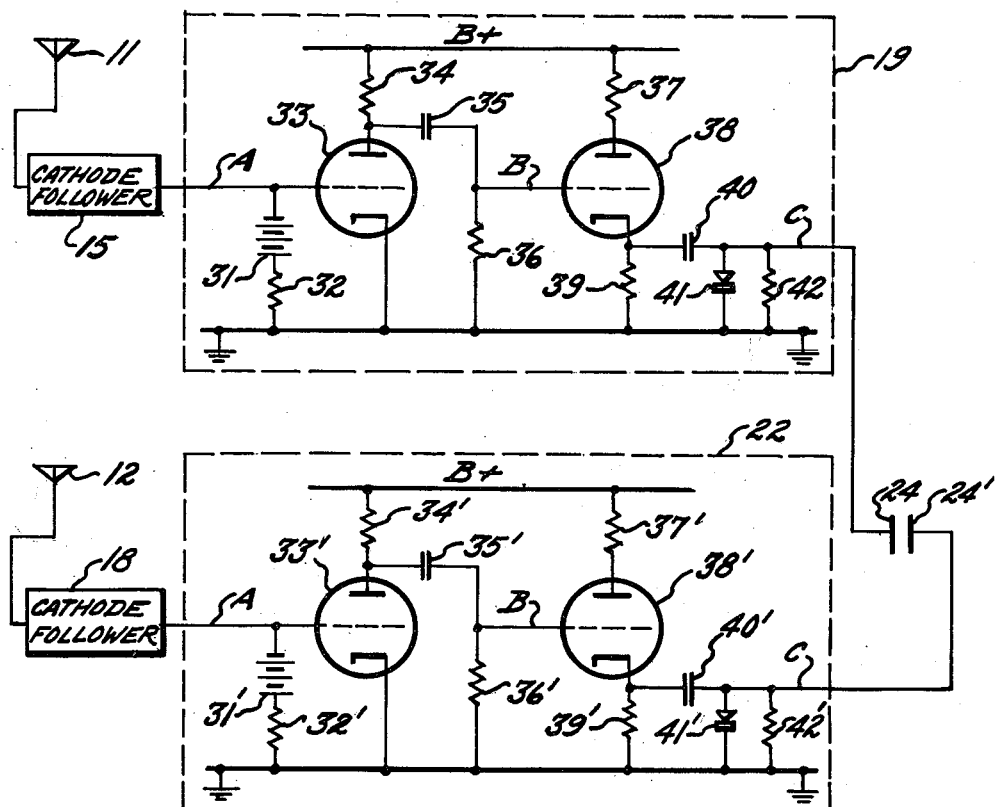
FIG. 2 is a schematic diagram of the modifier stage of said preferred embodiment.

The operation of the modifiers is best understood when described with reference to the schematic diagram of FIG. 2 and the waveforms illustrated in FIG. 3. Waveform 45 of FIG. 3a represents the typical signal that is applied to the grid of amplifier tube 33. Said amplifier tube 33 is greatly overdriven and is biased at cut-off by potential source 31 and resistor 32. Resistors 34 and 36, and capacitor 35 are conventional components associated with amplifier tube 33. The effect of this circuit arrangement is to clip the negative peaks of original waveform 45, and to convert the positive peaks to negative square waves. The resultant waveform, which is illustrated by waveform 46 of FIG. 3b, appears at point B of FIG. 2. Triode 38, together with associated resistors 37 and 39, operates as a cathode follower and holds the adjacent side of condenser 40 at the voltage $V_0$ until one of the negative square waves arrives at the grid. When said square wave arrives, triode 38 is cut off and the voltage on the adjacent side of condenser 40 drops to ground potential. The RC time constant of the resistor 42, condenser 40 combination is designed to be long compared to the fast rising square wave (about the length of a half cycle at the average frequency expected), and diode 41 is positioned to oppose the flow of current. This arrangement allows condenser 40 to discharge only through resistor 42 while causing the voltage on the output side of condenser 40 to drop to $-V_0$. The resultant waveform, which appears at point C is illustrated by curve 47 of FIG. 3c. Waveforms identical to said curve 47 are produced by each of the four modifier units by adjusting $V_0$ and the RC time constant to equal values in each of said units. These identical waveforms are fed to the cathode ray oscilloscope deflection plates as discussed in conjunction with FIG. 1. For example, referring to FIGS. 1 and 5, waveforms 47' and 53 which are responsive to signals received by N, S antennas 11 and 12, appear at cathode ray oscilloscope plates 24 with the phase relationship indicated by FIG. 5. The deflection between plates 24 is of course proportional to the difference in voltage between modifiers 19 and 22 as indicated by resultant curve 60 of FIG. 5. It can be readily seen that this difference in voltage is due only to the time difference of arrival of the respective waveforms, since the parameters of both modifiers are designed to produce identical waveforms.

The time difference in arrival of electromagnetic wavefront 51 between N, S antennas 11 and 12 is illustrated in FIG. 4 as being $\Delta t = d/c \cos \theta$. Similarly, the time difference in arrival between E, W antennas 13 and 14 would be $\Delta t = d/c \sin \theta$. In these relationships $d$ represents the antenna separation and $c$ the velocity of light.

Referring again to FIG. 5, peaks 56, 57, 58, and 59 of resultant curve 60 are fast rising and of short duration, and with correct adjustment of the cathode ray oscilloscope intensity, will not be seen. Consequently, only exponential decay portions 54 and 55 will cause observable deflection. The equation of this deflection is $$DxEn - E_s = V_0 e^{-t/rc} - V_0 e^{\frac{-(t\Delta t)}{RC}}$$

$$= V_0 e^{-t/rc}\left(1 - \frac{\Delta t}{erc}\right) = V_0 e^{-t/rc}\frac{(\Delta t)}{RC}$$

for small $\Delta t$. From the value of $\Delta t$ in FIG. 4 the form $Dx \cos \theta \ e^{-t/rc}$ is obtained. Similarly equation $Dx \sin \theta \ e^{-t/rc}$ may be derived for deflection in the east-west direction.

There has thus been disclosed novel circuitry whereby the several objects of my invention are achieved, and while I have described the principles thereof in connection with specific apparatus it is to be understood that this description is made only by way of example and not as a limitation to the scope of said invention as set forth in the accompanying claims.

I claim:
1. A radio direction finding system comprising, first and second pairs of spaced vertical antennas, said first pair of antennas being disposed at right angles to said second pair, means for converting the output voltage waveform of each of said antennas into a sawtooth voltage waveform representative of the relative arrival times of the respective waveforms, means for obtaining a first signal voltage representing the difference between the separate sawtooth waveforms responsive to the output of said first pair of antennas, means for obtaining a second signal voltage representing the difference between the separate sawtooth waveforms responsive to the output of said second pair of antennas, and means for comparing first and second signal voltages.

2. A radio direction finding system according to claim 1 wherein said means for converting the output voltage waveform of each of said antennas comprises, for each of said antennas, an amplifier tube having a cathode, an anode and a grid, said anode being connected to a potential source, said cathode being connected to ground and said grid being connected to said antenna output, said amplifier tube being overdriven and biased at cutoff, and operating to convert the output voltage waveform into a negative square wave, and means operating upon said negative square wave to convert it to sawtooth form.

3. A radio direction finding system according to claim 1 wherein said means for providing a sawtooth voltage waveform comprises a cathode follower tube in combination with resistor and capacitor means, said cathode follower tube having a cathode, an anode, and a grid, said anode being connected to a potential source and said grid being connected to the output of said amplifier tube, and said resistor and capacitor means being connected in parallel arrangement between the output of said cathode follower tube and ground.

References Cited in the file of this patent
UNITED STATES PATENTS
2,996,712    Richman _____ Aug. 15, 1961
FOREIGN PATENTS
479,689    Great Britain _____ Feb. 8, 1938